United States Patent [19]
Lew

[11] Patent Number: 5,127,273
[45] Date of Patent: Jul. 7, 1992

[54] VORTEX GENERATOR WITH TORSIONAL VORTEX SENSOR

[76] Inventor: Hyok S. Lew, 7890 Oak St., Arvada, Colo. 80005

[21] Appl. No.: 636,680

[22] Filed: Dec. 31, 1990

[51] Int. Cl.$^5$ ............................................. G01F 1/32
[52] U.S. Cl. ........................................... 73/861.24
[58] Field of Search ........................ 73/861.22, 861.24

[56] References Cited

U.S. PATENT DOCUMENTS

| | | | |
|---|---|---|---|
| 1,935,445 | 11/1933 | Heinz | 73/861.24 |
| 4,181,020 | 1/1980 | Herzl | 73/861.24 |
| 4,803,870 | 2/1989 | Lew | 73/861.24 |

Primary Examiner—Herbert Goldstein

[57] ABSTRACT

A vortex generator-sensor comprises a vortex generating bluff body disposed across a flow passage and a pressure sensing planar member disposed within a planar cavity included in the bluff body in a pivotable arrangement about a torsion axis disposed at the midsection of the pressure sensing planar member in a parallel relationship thereto, wherein alternating fluid pressure difference between the two opposite sides of the bluff body associated with the vortex shedding from the bluff body is introduced to the two opposite halves of the pressure sensing planar member by a plurality of pressure communicating holes in such a way that the alternating fluid pressure difference creates a torsional movement of the pressure sensing planar member about the torsion axis, which is converted to an alternating electrical signal by a transducer connected to the pressure sensing planr member.

18 Claims, 3 Drawing Sheets

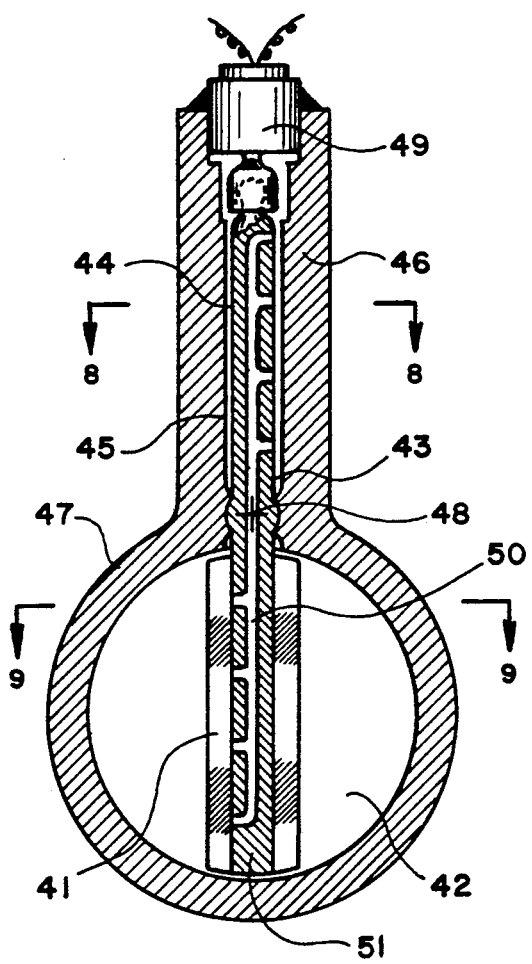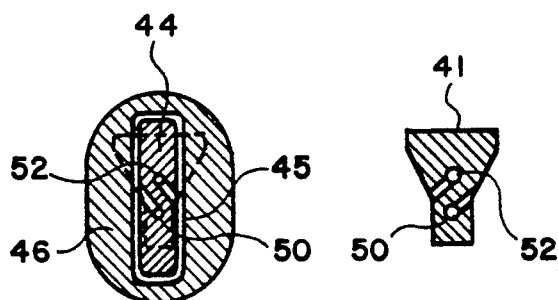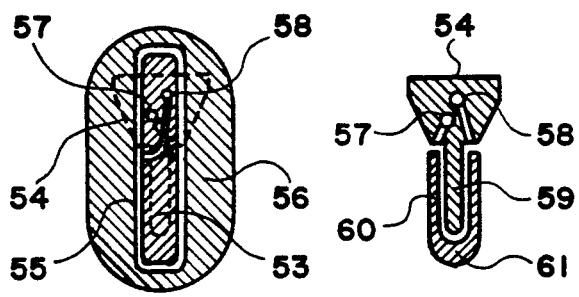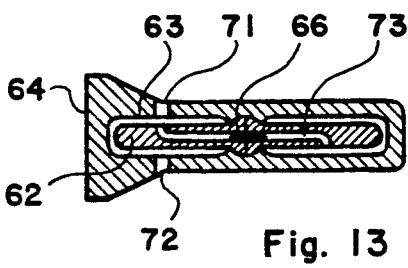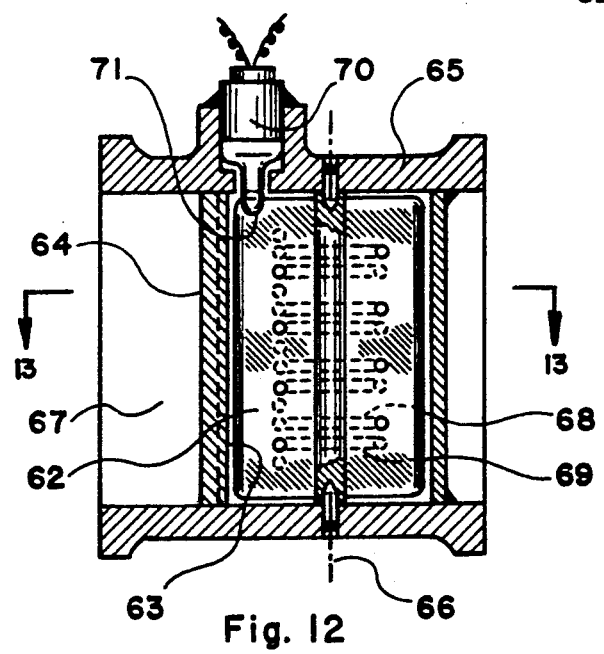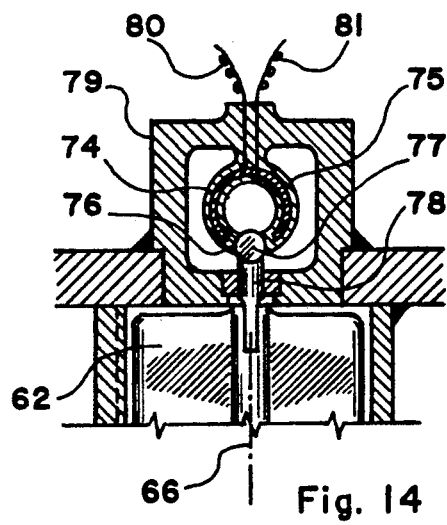

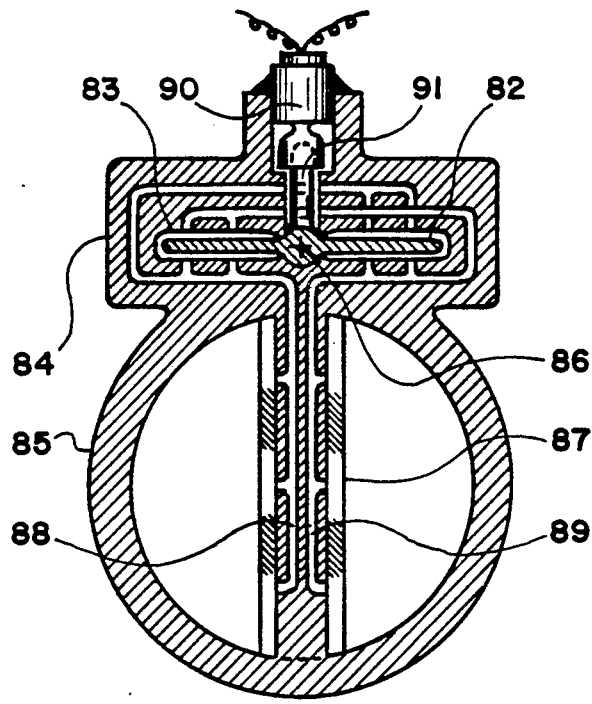
Fig. 15
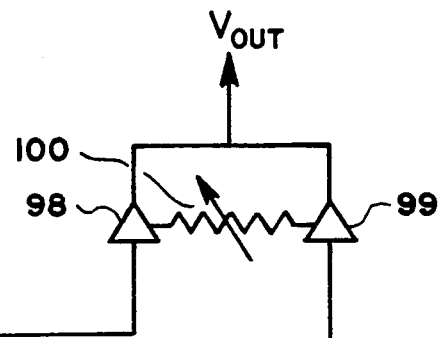
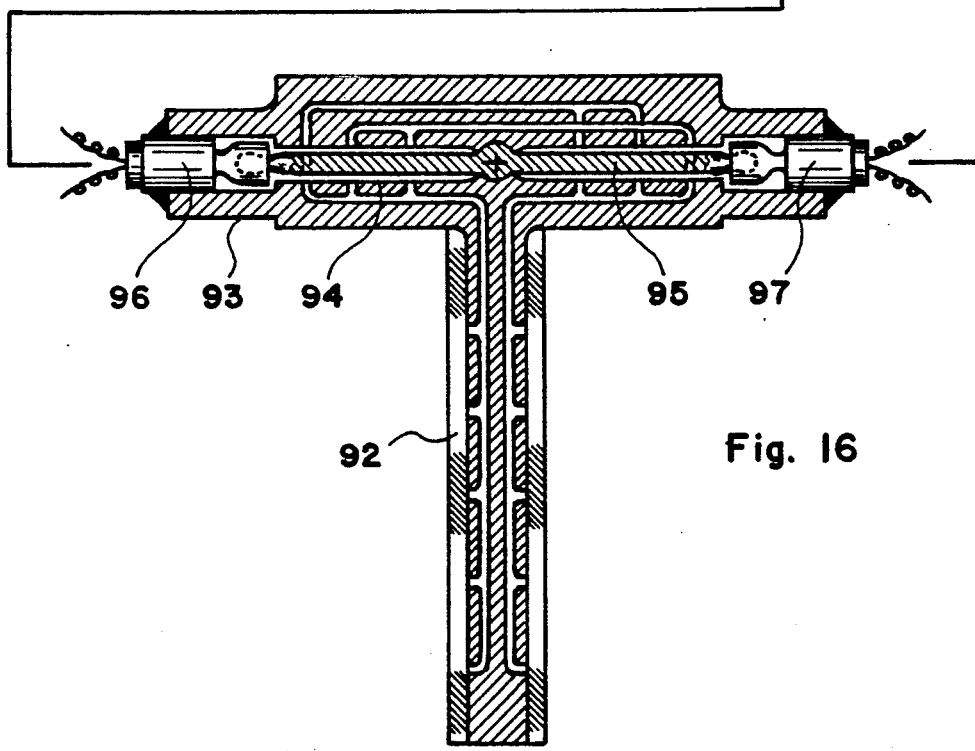
Fig. 16

VORTEX GENERATOR WITH TORSIONAL VORTEX SENSOR

BACKGROUND OF THE INVENTION

There are two different types of design employed in the construction of vortex shedding flowmeters. In the first type, the vortex shedding flowmeter has a vortex generator-sensor comprising a vortex generating bluff body of elongated cylindrical shape disposed across the flow passage and a vortex sensing device built into the bluff body, while in the second type, the vortex shedding flowmeter has a vortex generating bluff body and a vortex sensor respectively disposed across two different cross sections of the flow passage in a structurally independent arrangement. While the first type of design provides a structurally compact flowmeter, the second type of design provides a vortex flowmeter with greater sensitivity and reliabilty. For example, a state of the art version of the vortex shedding flowmeter employing the second type design operates in a range of turn-down ratio (the ratio of the maximum to minimum measurable velocities of the fluid) approaching 100 to 1, while the best of the first type of design yields a turn-down ratio of 15-20 to 1 at most. The present invention teaches how to improve the sensitivity of the vortex shedding flowmeter with a vortex sensor-generator of a structurally integral construction and increase the turn-down ratio thereof.

BRIEF SUMMARY OF THE INVENTION

The primary object of the present invention is to provide a vortex shedding flowmeter comprising a vortex generating bluff body of elongated cylindrical shape disposed across the flow passage and a pressure sensing planar member disposed within a planar cavity in a pivotable arrangement about a torsion axis dividing the pressure sensing planar member into two halves, wherein the two opposite sides of the first half of the pressure sensing planar member located on one side of a plane including the torsion axis are respectively exposed to the fluctuating fluid pressures at the two opposite sides of the vortex sensing planar member, which fluctuating fluid pressures associated with vortex shedding from the two opposite sides of the bluff body exert a torque on the pressure sensing planar member about the torsion axis, which is converted to an alternating electrical signal by a transducer.

Another object is to provide the vortex shedding flowmeter described in the primary object of the present invention wherein the two opposite sides of the second half of the pressure sensing planar member located on the other side of the torsion axis are respectively exposed to the fluctuating fluid pressures at the two opposite sides of the bluff body in an arrangement opposite to that employed in the first half of the vortex sensing planar member, whereby the pressure difference across the both halves of the pressure sensing planar member exerts a torque on the pressure sensing planar member about the torsion axis in the same direction.

A further object is to provide the vortex shedding flowmeter described in the primary object, wherein the pressure sensing planar member is disposed at least in part within a planar cavity included in the vortex generating bluff body, and the torsion axis thereof is generally parallel to the central axis of the flow passage.

Yet another object is to provide the vortex shedding flowmeter described in the primary object wherein the pressure sensing planar member is disposed at least in part within a planar cavity included in the vortex generating bluff body, and the torsion axis thereof is generally perpendicular to the central axis of the flow passage.

Yet a further object is to provide a vortex shedding flowmeter comprising a vortex generating bluff body of elongated cylindrical shape disposed across the flow passage, which bluff body includes a planar extension disposed within a planar cavity, and the combination of the bluff body and the planar extension thereof is supported by the flowmeter body pivotably about a torsion axis disposed at a midsection thereof generally parallel to the central axis of the flow passage, and includes a first pressure transmitting hole with one end open to one side of the bluff body and the other end open to the other side of the planar extension opposite to said one side and a second pressure transmitting hole with one end open to the other side of the bluff body opposite to said one side and the other end open to one side of the planar extension same as said one side, wherein a transducer converts the torque about the torsion axis to an alternating electrical signal.

These and other objects of the present invention will become clear as the description of the invention progresses.

BRIEF DESCRIPTION OF THE FIGURES

The present invention may be described with a greater clarity and specificity by referring to the following figures:

FIG. 7 illustrates a cross section of a further embodiment of the present invention.

FIG. 8 illustrates a cross section of the planar extension of the vortex generating bluff body included in the embodiment shown in FIG. 7.

FIG. 9 illustrates a cross section of the bluff body included in the embodiment shown in FIG. 7.

FIG. 10 illustrates a cross section of the planar extension of another embodiment of the vortex generating bluff body.

FIG. 11 illustrates a cross section of another embodiment of the vortex generating bluff body with the planar extension shown in FIG. 10.

FIG. 12 illustrates a cross section of yet another embodiment of the present invention.

FIG. 13 illustrates a cross section of the vortex generator-sensor included in the embodiment shown in FIG. 12.

FIG. 14 illustrates a cross section of an embodiment of the torque sensor usable in the construction of the vortex shedding flowmeter of the present invention.

FIG. 15 illustrates a cross section of yet a further embodiment of the present invention.

FIG. 16 illustrates a cross section of still another embodiment of the present invention.

DESCRIPTION OF THE ILLUSTRATED EMBODIMENTS

Figure 1:
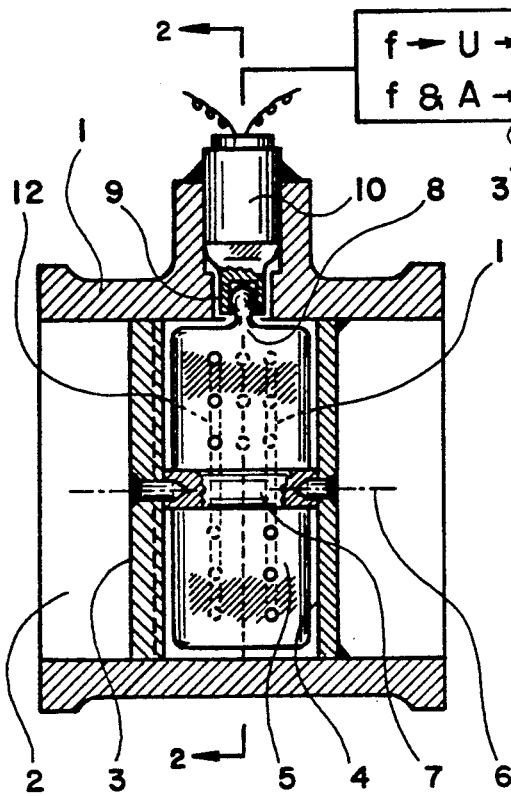
FIG. 1 illustrates a cross section of an embodiment of the present invention.

In FIG. 1 there is illustrated a cross section of the vortex shedding flowmeter constructed in accordance with the principles of the present invention. The flowmeter 1 includes a flow passage 2 extending therethrough. A vortex generating bluff body 3 of elongated cylindrical shape is disposed across the flow passage 2 and secured to the flowmeter body 1 at the two extremities thereof. The bluff body 3 includes a planar cavity 4 that houses a pressure sensing planar member 5 in a clearance relationship therebetween, wherein the pressure sensing planar member 5 is supported by the bluff body 3 pivotably over at least a minute angle about the torsion axis 6 generally parallel to the central axis of the flow passage 2. The space between the wall of the planar cavity 4 and the pressure sensing planar member 5 is divided into two halves by the midsection of the pressure sensing planar member 5 having a circular cylindrical rib structure 7 coaxial to the torsion axis 6, that engages a matching circular cylindrical bearing surface included in the bluff body 3, which combination allows a pivoting movement about the torsion axis 6 for the pressure sensing planar member 5, while substantially limiting the pressure communication between the two halves of the space intermediate the wall of the planar cavity 4 and the pressure sensing planar member 5. An extremity 8 of the pressure sensing planar member 5 is connected to a force receiving member 9 extending from a transducer container vessel 10 anchored to the flowmeter body 1, that contains a transducer element converting the torsional movement of the pressure sensing planar member 5 about the torsion axis 6 to an alternating electrical signal. The pressure sensing planar member 5 includes at least two pressure communicating holes 11 and 12, which are to be described in conjunction with FIG. 2.

Figure 2:
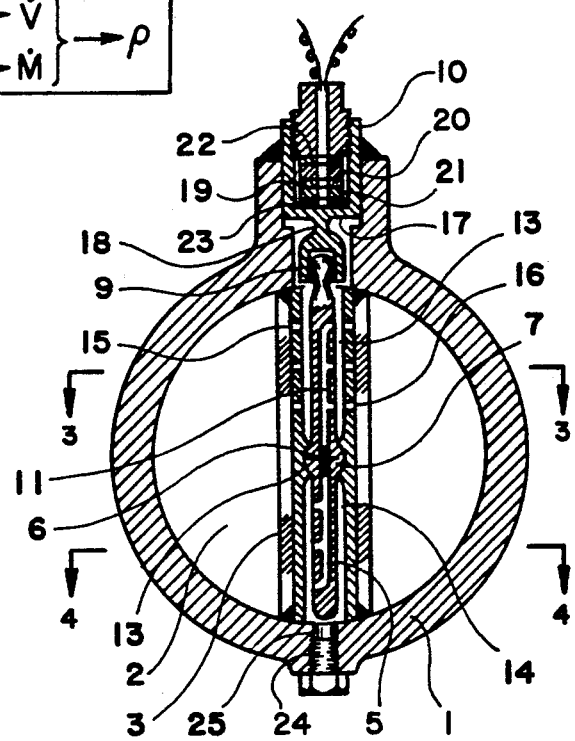
FIG. 2 illustrates another cross section of the embodiment shown in FIG. 1.

In FIG. 2 there is illustrated another cross section of the vortex shedding flowmeter shown in FIG. 1, which cross section taken along plane 2—2 as shown in FIG. 1 clearly shows the construction of the midsection of the pressure sensing planar member 5 including the circular cylindrical rib structure 7 engaging the matched circular cylindrical bearing surface 13 included in the bluff body 3, that supports the pressure sensing planar member 5 pivotably about the torsion axis 6, while limiting the pressure communication between the first half 14 and the second half 15 of the space between the wall of the planar cavity 4 and the pressure sensing planar member 5. The two opposite side walls of the first half 14 of the space includes a plurality of holes or openings 15, 16, etc. respectively extending therethrough and open to the two opposite side walls of the bluff body 3, whereby the two opposite sides of the first half of the pressure sensing planar member 5 are respectively exposed to fluctuating fluid pressures associated with the vortex shedding at the two opposite side surfaces of the bluff body 3. The pressure communicating hole 11 has one extremity open to one side of the first half of the pressure sensing planar member 5 and the other extremity open to the other side of the second half of the pressure sensing planar member 5 opposite to said one side, while the pressure communicating hole 11 (hidden behind the hole 12 in the cross sectional view shown in FIG. 2) has one extremity open to the other side of the first half of the pressure sensing planar member 5 opposite to said one side and the other extremity open to one side of the second half of the pressure sensing planar member 5 same as said one side. As a consequence, the fluctuating fluid pressures at the two opposite sides of the bluff body 3 fluctuating in an alternating mode associated with vortices shed therefrom in an alternating pattern generate an alternating torsional movement of the pressure sensing planar member 5 about the torsion axis, which is converted to an alternating electrical signal by the transducer contained in the transducer container vessel 10 that includes a deflective end wall 17 reinforced by a rib 18 disposed diametrically thereacross on a plane parallel to the pressure sensing planar member 5, from which reinforcing rib the force receiving member 9 extends. The transducer contained in the transducer container vessel 10 comprises a piezo electric disc element 19 sandwiched between a pair of electrode discs 20 and 21, and a pair of insulator discs 22 and 23, which combination of discs are pressed against the deflective end wall 17 of the transducer container vessel 10. The threaded plug 24 plugging the hole 25 open to the planar cavity 4 is for purging debris accumulating therein. It should be understood that the transducer assembly packaged in the transducer container vessel 10 may be of some other type such as capacitive, inductive, resistive or fiber optic transducers instead of the piezo electric transducer shown. It should also be mentioned that the pressure sensing planar member 5 may include another transducer connected to the other extremity thereof opposite to the extremity 8, wherein the electrical signals from the two transducers are combined as shown in and described in conjunction with FIG. 16. It is readily recognized that the vortex sensor comprising the pressure sensing planar member 5 and the transducer assembly 10 works without the pressure communicating holes 11 and 12. In such a modification of the embodiment, the purpose of the second half of the pressure sensing planar member 5 disposed in the second half 14 of the space is to balance the pressure sensing planar member 5 about the torsion axis 6 in the mass distribution or the moment of inertia distribution. In general, the pressure sensing planar member 5 should be balanced about the torsion axis 6 in mass distribution or moment of inertia distribution, which balancing greatly improves the rejection of noise generated by the mechanical vibration of the flowmeter in obtaining the electrical signal that represents the vortex shedding from the bluff body 3.

Figure 3:
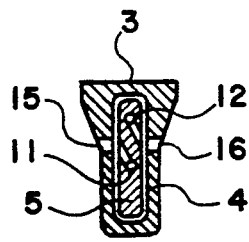
FIG. 3 illustrates a cross section of the vortex generator-sensor included in the embodiment shown in FIGS. 1 and 2.

In FIG. 3 there is illustrated a cross section of the first half of the vortex generator-sensor comprising the combination of the bluff body 3 and the pressure sensing planar member 5, which cross section is taken along plane 3—3 as shown in FIG. 2. The two opposite side walls of the first half of the planar cavity 4 housing the first half of the vortex sensing planar member 5 include openings 15 and 16 respectively breaking through the two opposite sides of the bluff body 3 and, consequently, the two opposite sides of the first half of the pressure sensing planar member 5 are respectively exposed to the fluctuating fluid pressure at the two opposite sides of the bluff body 3. The pressure communicating holes 11 and 12 included in the pressure sensing planar member 5 and extending across the midsection thereof respectively break through the two opposite sides of the first half of the pressure sensing planar member 5. It should be understood that the openings 15 and 16 through the two opposite side walls of the planar cavity 4 may comprise one or more holes or slitted openings disposed parallel to the longitudinal axis of the pressure sensing planar member 5.

Figure 4:
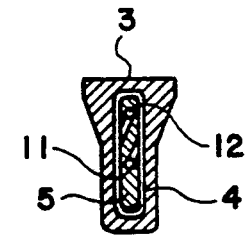
FIG. 4 illustrates another cross section of the vortex generator-sensor included in the embodiment shown in FIGS. 1 and 2.

In FIG. 4 there is illustrated a cross section of the second half of the vortex generator-sensor comprising the combination of the bluff body 3 and the pressure sensing planar member 5, which cross section is taken along plane 4—4 as shown in FIG. 2. The two opposite side walls of the second half of the planar cavity 4 do not include any openings. As the pressure communicating holes 11 and 12 respectively break through the two opposite sides of the second half of the pressure sensing planar member 5 in an arrangement opposite to that employed in the first half of the pressure sensing planar member 5, the first side of the first half and the second side of the second half of the pressure sensing planar member 5 are exposed to the fluid pressure at the first side surface of the bluff body 3, while the second side of the first half and the first side of the second half of the pressure sensing planar member are exposed to the fluid pressure at the second side surface of the bluff body 3, which combination of the exposures to the fluctuating fluid pressures associated with the vortex shedding from the bluff body 3 produces alternating torque about the torsion axis of the pressure sensing planar member 5.

Figure 5:
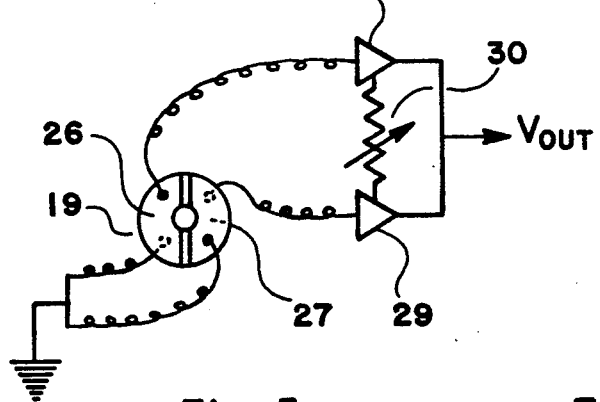
FIG. 5 illustrates a plan view of an embodiment of the piezo electric disc employed in the construction of the transducer included in the embodiment shown in FIG. 2, and an electric circuit conditioning signals generated thereby.

In FIG. 5 there is illustrated a plan view of an embodiment of the piezo electric element 19 included in the transducer assembly employed in the construction of the vortex shedding flowmeter shown in FIGS. 1 and 2. Each side of the piezo electric element 19 has a pair of semicircular electrodes respectively disposed on the two opposite sides of a reference plane including the reinforcing rib 18 included in the embodiment shown in FIG. 2, which plane is disposed generally parallel to the pressure sensing planar member 5. One electrode 26 disposed on the first side of piezo electric element 19 and on one side of the reference plane, and another electrode disposed on the second side of the piezo electric element 19 and on the other side of the reference plane are respectively connected to two amplifiers 28 and 29 with a signal balancing means 30 therebetween. Other electrodes not connected to the amplifiers 28 and 29 are grounded. The torsional movement of the pressure sensing planar member 5 about the torsion axis 6 generated by the vortex shedding from the bluff body 3 alternatively compresses and decompresses the two opposite halves of the piezo electric element 19 located on the two opposite sides of the reference plane. The signal balancing means 30 is used to combine the electromotive forces supplied by the two opposite halves of the piezo electric element 19 in such a way that the noise associated with the mechanical vibrations of the flowmeter body is cancelled between the two amplifiers 28 and 29 and an output signal $V_{OUT}$ representing the vortex shedding from the bluff body 3 is obtained. In an alternative embodiment, two electrodes belonging to the same side and disposed on the two opposite sides of the reference plane may be respectively connected to an inverting and noninverting amplifier with a signal balancing means therebetween, which combination accomplishes the same object as that of the embodiment shown in FIG. 5. As the vortex shedding frequency is proportional to the velocity of fluid, the fluid velocity U or the volume flow rate $\dot{V}$ is determined from the frequency f of the alternating electrical signal $V_{OUT}$ representing the vortex shedding by using an empirically determined mathematical relationship therebetween. The amplitude of the alternating signal $V_{OUT}$ is a function of the dynamic pressure of the fluid flow, that is equal to one half of the fluid density times the square of the velocity. Therefore, the mass flow rate $\dot{M}$ of fluid can be determined as a function of the frequency and the amplitude A of the alternating electrical signal $V_{OUT}$ by using an empirically determined mathematical relationship. The fluid density $\rho$ is determined as the ratio of the mass flow rate to the volume flow rate. The algorithm determining the fluid velocity, volume and mass flow rates and the fluid density is carried out by a data processor 31 included in the embodiment shown in FIG. 1, that uses $V_{OUT}$ as the input data.

Figure 6:
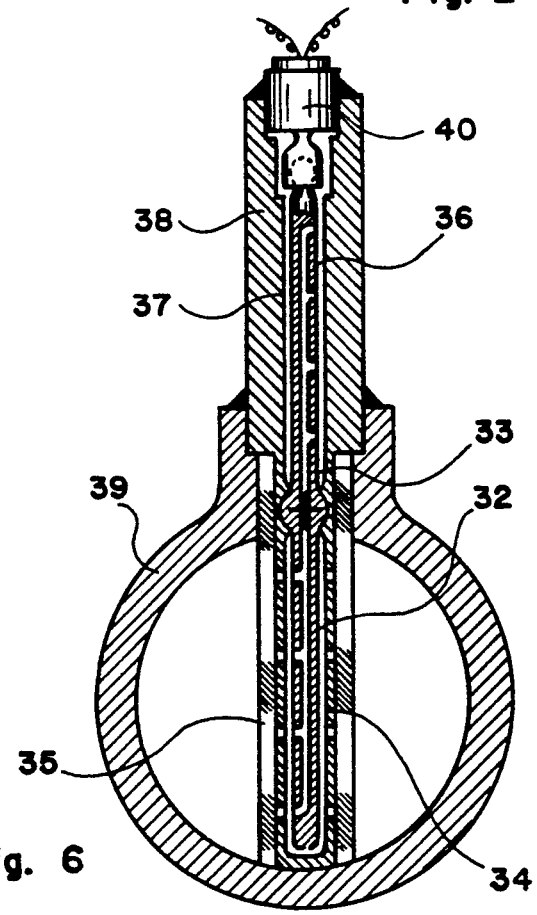
FIG. 6 illustrates a cross section of another embodiment of the present invention.

In FIG. 6 there is illustrated a cross section of another embodiment of the vortex shedding flowmeter having a construction and operating principles essentially the same as those of the embodiment shown in FIGS. 1 and 2 with a few exceptions, wherein only the first half 32 of the pressure sensing planar member 33 is disposed within a planar cavity 34 included in the vortex generating bluff body 35. The second half 36 of the pressure sensing planar member 33 is disposed within a planar cavity 37 included in an extension 38 of the flowmeter body 39. The first half 32 of the pressure sensing planar member 33 is directly exposed to the fluid pressure, while the second half 36 is exposed to the fluid pressure transmitted through the pressure communicating holes in the same arrangement as that described in conjunction with FIGS. 2, 3 and 4. The transducer 40 is connected to the extremity of the second half 36 of the pressure sensing planar member 33. In an alternative embodiment, a single transducer may be connected to the extremity of the first half 32 of the pressure sensing planar member 33 or a pair of transducers may be respectively connected to the two opposite extremities of the pressure sensing planar member 33. It should be understood that the embodiment shown in FIG. 6 works without the pressure communicating holes included in the pressure sensing planar member 33, wherein the second half 36 thereof merely counter balances the first half 32.

In FIG. 7 there is illustrated a cross section of a further embodiment of the vortex shedding flowmeter of the present invention, which embodiment is particularly adapted to the construction of a vortex shedding flowmeter with a small diameter flow passage. The vortex shedding bluff body 41 disposed across the flow passage 42 constitutes the first half of the pressure sensing elongated member 43 that has a second half 44 of planar shape disposed within a planar cavity 45 included in an elongated extension 46 of the flowmeter body 47. The combination of the bluff body 41 and the planar extension 44 thereof constituting the vortex sensor 43 is supported by the flowmeter body 47 pivotably about the torsion axis 48 disposed at the midsection of the vortex sensor in a relationship parallel to the central axis of the flow passage 42. As the vortex shedding from the bluff body 41 becomes unfavorably interferred by any flexural vibration of the bluff body 41, the torsional movement of the vortex sensor 43 about the torsion axis 48 must be limited to the minimum extent that still transmits the torque experienced by the vortex sensor 43 to the transducer 49 connected to one of the two extremities of the vortex sensor 43. The pressure communicating holes such as the element 50 included in the vortex sensor 43 with one extremity open to one side of the bluff body 41 and the other extremity open to the other side of the planar extension 44 opposite to said one side expose the two opposite sides of the planar extension 44 to the fluctuating fluid pressures at the two opposite sides of the bluff body 41 in the same arrangement as that described in conjunction with FIGS. 2, 3 and 4. It should be understood that those pressure communicating holes such as the element 50 may be omitted in a simpler version of the embodiment shown in FIG. 7, wherein the planar extension merely counter-balances the bluff body 41, in which case the transducer 49 should be relocated and connected to the extremity 51 of the bluff body 41. Of course, a pair of transducers may be respectively connected to the two opposite extremities of the vortex sensor 43 in an arrangement similar to that shown in FIG. 16.

In FIG. 8 there is illustrated a cross section of the combination of the planar extension 44 of the bluff body 41 and the elongated structural extension 46 of the flowmeter body 47, which cross section is taken along plane 8—8 as shown in FIG. 7. One extremity of the pressure communicating hole 50 included in the vortex sensor 43 and extending across the midsection thereof is open to one side of the planar extension 44 of the bluff body 41, while the other extremity thereof is open to the other side of the bluff body 41 opposite to said one side. The pressure communicating hole 50 has one extremity open to the other side of the planar extension 44 opposite to said one side, and the other extremity open to one side of the bluff body 41 same as said one side.

In FIG. 9 there is illustrated a cross section of the bluff body 41 taken along plane 9—9 as shown in FIG. 7. The pressure communicating holes 50 and 52 included in the bluff body 41 transmit the fluctuating fluid pressure at the two opposite sides of the bluff body 41 to the two opposite sides of the planar extension 44 of the bluff body 41 in a cross connecting arrangement.

In FIG. 10 there is illustrated a cross section of a planar extension 53 of another embodiment of the vortex generating bluff body 54, which combination can be used in place of the vortex sensor 43 included in the embodiment shown in FIG. 7. The planar extension 53 is disposed within a planar cavity 55 included in a structural extension 56 of the flowmeter body as shown in FIG. 7 and includes the pressure communicating holes 57 and 58 having the same arrangement and the same purpose as the element 50 and 52 shown in FIGS. 8 and 9.

In FIG. 11 there is illustrated a cross section of the bluff body 54 that includes the pressure communicating holes 57 and 58. The vortex generating bluff body 54 has a planar trailing edge extension 59 engaging a planar groove 60 included in an elongated pressure shielding member 61 disposed across the flow passage and anchored to the flowmeter body at the two extremities thereof.

In FIG. 12 there is illustrated a cross section of yet another embodiment of the vortex shedding flowmeter of the present invention, that has essentially the same construction and operating principles as those shown in and described in conjunction with FIGS. 1 and 2. In this embodiment, the pressure sensing planar member 62 disposed within a planar cavity 63 included in the vortex shedding bluff body 64 is supported by the flowmeter body 65 pivotably over at least a minute angle about the torsion axis 66 perpendicular to the central axis of the flow passage 67. The two opposite side walls of the upstream side half of the planar cavity 63 respectively include two sets of holes exposing the two opposite sides of the upstream side half of the pressure sensing planar member 62 to the fluctuating fluid pressures at the two opposite sides of the bluff body 64. A plurality of pressure communicating holes 68, 69, etc included in the pressure sensing planar member 62 and extending across the midsection thereof including the torsion axis 66 introduce the fluctuating fluid pressures existing at the two opposite sides of the bluff body 64 to the two opposite sides of the downstream side half of the pressure sensing planar member 62 in a cross connecting arrangement as described in conjunction with FIGS. 2, 3 and 4. A transducer 70 connected to a deflective portion 71 of the pressure sensing planar member 62 located in an off set relationship to the torsion axis converts the torque about the torsion axis 66 experienced by the pressure sensing planar member 62 to an alternating electrical signal.

In FIG. 13 there is illustrated a cross section of the vortex generator-sensor comprising the bluff body 64 and the pressure planar member 62, sensor comprising the bluff body 64 and the pressure sensing planar member 62, which cross section taken along plane 13—13 as shown in FIG. 12 clearly shows the arrangement that allows a pivoting movement of the pressure sensing planar member 62 about the torsion axis 66 and partitioning the space between the wall of the planar cavity 63 and the pressure sensing planar member 62 into the up-and downstream side halves in an arrangement limiting the pressure communication therebetween. The openings 71 and 72 respectively disposed through the two opposite side walls of the upstream half of the planar cavity 63 expose the two opposite sides of the upstream side half of the pressure sensing planar member 62 to the fluctuating fluid pressure at the two opposite sides of the bluff body, while the pressure communicating holes 73, 68, 69, etc. expose the two opposite sides of the downstream side half of the pressure sensing planar member 62 to the fluctuating fluid pressures existing at the two opposite sides of the bluff body 64 in a cross connecting arrangement. It should be mentioned that the embodiment shown in FIGS. 12 and 13 works without the pressure communicating holes 68, 69, 73, etc. wherein the downstream side half of the pressure sensing planar member 62 merely counter balances the upstream side half thereof. Another transducer may be connected to a deflective portion of the downstream side half of the pressure sensing planar member 62 in a mirror image to the transducer 70 about a plane including the torsion axis 66, wherein the signals from the two transducers are combined as described in conjunction with FIG. 16.

In FIG. 14 there is illustrated a cross section of a torque sensor that can be employed in the construction of the vortex shedding flowmeter shown in FIG. 12 in place of the stress sensor 70. A circular cylindrical shell piezo electric element 74 with an axial cutout is encapsulated by a metallic circular cylindrical shell 75 having an axial cut out 76 that receives in an wedged-in relationship an extremity 77 of a noncircular cross section included in the torque transmitting member 78 disposed coaxially to the torsion axis 66 in a rotatable arrangement and nonrotatably coupled to the midportion of one extremity of the pressure sensing planar member 62. The metallic circular cylindrical shell 75 is anchored to the transducer container vessel 79 at a section thereof diametrically opposite to the axial cut out 76. A pair of lead wires 80 and 81 extend respectively from the two circular cylindrical shell electrodes in contact with the two opposite circular cylindrical sides of the piezo electric element 74, respectively, and insulated from the metallic encapsulation 75, which two lead wires are respectively connected to an inverting and a noninverting amplifier with a signal balancing means therebetween, wherein the outputs from the two amplifiers are combined in such a way that the noise associated with the mechanical vibrations of the flowmeter body is cancelled and an output signal representing the vortex shedding from the bluff body is obtained.

In FIG. 15 there is illustrated a cross section of yet a further embodiment of the vortex shedding flowmeter of the present invention, which embodiment operates on the same principles as those described in conjunction with FIGS. 1-5. In this particular illustrative embodiment, the pressure sensing planar member 82 is disposed within a planar cavity 83 included in a structural extension 84 of the flowmeter body 85 in a pivotable arrangement about the torsion axis 86. The fluctuating fluid pressures existing at the two opposite sides of the vortex shedding bluff body 87 are introduced to the two opposite sides of the pressure sensing planar member 82 by the pressure communicating holes 88 and 89 in the same manner as that described in conjunction with FIGS. 1, 2, 3 and 4, whereby the fluctuating fluid pressures associated with the vortex shedding from the bluff body 87 exert an alternating torque on the pressure sensing planar member 82 about the torsion axis 86. The transducer 90 connected to a lateral extension 91 extending from the midsection of the pressure sensing planar member 82 converts the torque experienced by the pressure sensing planar member to an alternating electrical signal. In an alternative embodiment, the transducer 90 may be relocated and connected to one of the two extremities of the pressure sensing planar member 82 as exemplified by the embodiment shown in FIG. 2.

In FIG. 16 there is illustrated an insertion type version of the vortex shedding flowmeter shown in FIG. 15, wherein the wall of the flow passage is now eliminated and the vortex shedding bluff body 92 extending into the fluid stream is anchored to a flange structure 93 including the cavity 94 housing the pressure sensing planar member 95. As an alternative to the arrangement of the transducer 90 shown in FIG. 15, a pair of transducer 96 and 97 are respectively connected to the two opposite extremities of the pressure sensing planar member 95. The two transducers 96 and 97 are respectively connected to a pair of amplifiers 98 and 99 with a signal balancing means 100 therebetween, wherein the signal balancing means 100 is used to combine the outputs from the two amplifiers 98 and 99 in such a way that the noise generated by the mechanical vibration of the vortex sensor-generator is cancelled and a refined signal $V_{out}$ representing the vortex shedding from the bluff body 92 is obtained. Depending on the relative polarities of the two transducers 96 and 97, a pair of noninverting amplifiers, or an inverting and a noninverting amplifier may be employed as the two amplifiers 98 and 99. It is readily recognized that the in-line vortex sensor-generator shown in FIGS. 2, 6, 7 or 12 can be readily modified to an insertion type exemplified by the vortex flowmeter shown in FIG. 16 by eliminating the wall of the flow passage and adding an anchoring flange to the portion of the flowmeter body including the transducer. Of course, the embodiments shown in FIGS. 2, 6, 7 and 12 can be used as an insertion type flowmeter by adding an elongated support to the flowmeter body and an anchoring flange disposed at the extremity of the elongated support, wherein the embodiment shown is inserted into a midstream of a fluid flow.

While the principles of the present inventions have now been made clear by the illustrative embodiments, there will be many modifications of the structures, arrangements, proportions, elements and materials, which are obvious to those skilled in the art and particularly adapted to the specific working environments and operating conditions in the practice of the inventions without departing from those principles. It is not desired to limit the inventions to those illustrative examples shown and described and accordingly, all suitable modifications and equivalents may be regarded as falling within the scope of the inventions as defined by the claims which follow.

The embodiments of the invention, in which an exclusive property or priviledge is claimed, are defined as follows:

1. An apparatus for measuring fluid flow comprising in combination:
   a) a vortex generating bluff body of elongated cylindrical shape disposed at least partially across a flow passage;
   b) a pressure sensing planar member disposed within a planar cavity included at least in part in the vortex generating bluff body on a plane substantially parallel to the direction of fluid flow and supported by the wall of the planar cavity in an arrangement allowing at least a minute amount of pivoting movement of the pressure sensing planar member about a torsion axis disposed at a midsection of the pressure sensing planar member in a generally parallel relationship to the plane including the pressure sensing planar member and to the direction of the fluid flow, wherein the mass distribution of the pressure sensing planar member is balanced about the torsion axis;
   c) at least one opening extending from one side surface of the vortex generating bluff body to one side wall of the planar cavity adjacent to one side surface of a first half of the pressure sensing planar member located on one side of a plane including the torsion axis, and at least another opening extending from the other side surface of the vortex generating bluff body opposite to said one side surface thereof to the other side wall of the planar cavity opposite to said one side wall thereof and adjacent to the other side surface of said first half of the pressure sensing planar member opposite to said one side surface thereof; and
   d) transducer means converting a torque about the torsion axis experienced by the pressure sensing planar member to a fluctuating electrical signal providing information on vortex shedding from the vortex generating bluff body.

2. A combination as set forth in claim 1 wherein said combination includes means for determining velocity of the fluid as a function of frequency of said fluctuating electrical signal.

3. A combination as set forth in claim 1 wherein said combination includes means for determining mass flow rate of the fluid as a function of frequency and amplitude of said fluctuating electrical signal.

4. A combination as set forth in claim 3 wherein said combination includes means for determining density of the fluid from ratio of the mass flow rate to volume flow rate of the fluid determined as a function of frequency of said fluctuating electrical signal.

5. A combination as set forth in claim 1 wherein the pressure sensing planar member includes at least one pressure communicating hole with one end open to said one side surface of the first half thereof and the other end open to the other side surface of a second half of the pressure sensing planar member opposite to said one side surface thereof, wherein the first and second halves of the pressure sensing planar member are respectively located on two opposite sides of the plane including the torsion axis.

6. A combination as set forth in claim 5 wherein the pressure sensing planar member includes at least another pressure communicating hole with one end open to said the other side surface of the first half thereof opposite to said one side surface thereof and the other end open to one side surface of the second half of the pressure sensing planar member opposite to said the other side surface thereof.

7. A combination as set forth in claim 6 wherein said combination includes means for determining velocity of the fluid as a function of frequency of said fluctuating electrical signal.

8. A combination as set forth in claim 6 wherein said combination includes means for determining mass flow rate of the fluid as a function of frequency and amplitude of said fluctuating electrical signal.

9. A combination as set forth in claim 8 wherein said combination includes means for determining density of the fluid from ratio of the mass flow rate to volume flow rate of the fluid determined as a function of frequency of said fluctuating electrical signal.

10. A combination as set forth in claim 6 wherein the pressure sensing planar member is disposed within the planar cavity included in a combination of the vortex generating bluff body and a structural extension thereof extending from one extremity of the vortex generating bluff body and supported by the wall of the planar cavity in an arrangement allowing at least a minute amount of pivoting movement about the torsion axis, wherein said first half of the pressure sensing planar member is disposed substantially within a first half of the planar cavity included in the vortex generating bluff body and said second half of the pressure sensing planar member is disposed substantially within a second half of the planar cavity included in said structural extension of the vortex generating bluff body.

11. An apparatus for measuring fluid flow comprising in combination:
   a) a vortex generating bluff body of elongated cylindrical shape disposed at least partially across a flow passage;
   b) a pressure sensing planar member disposed within a planar cavity included at least in part in the vortex generating bluff body and supported by the wall of the planar cavity in an arrangement allowing at least a minute amount of pivoting movement of the pressure sensing planar member about a torsion axis disposed at a midsection of the pressure sensing planar member parallel to a plane including the pressure sensing planar member;
   c) at least one opening extending from one side surface of the vortex generating bluff body to one side wall of the planar cavity adjacent to one side surface of a first half of the pressure sensing planar member located on one side of a plane including the torsion axis, and at least another opening extending from the other side surface of the vortex generating bluff body opposite to said one side surface thereof to the other side wall of the planar cavity opposite to said one side wall thereof and adjacent to the other side surface of said first half of the pressure sensing planar member opposite to said one side surface thereof;
   d) at least one pressure communicating hole with one extremity open to fluid pressure existing at said one side surface of the vortex generating bluff body and the other extremity emerging through said the other side wall of the planar cavity adjacent to the other side surface of a second half of the pressure sensing planar member located on the other side of the plane including the torsion axis opposite to said one side surface thereof, and at least another pressure communicating hole with one extremity open to fluid pressure existing at said the other side surface of the vortex generating bluff body opposite to said one side surface thereof and the other extremity emerging through said one side wall of the planar cavity adjacent to one side surface of said second half of the pressure sensing planar member opposite to said the other side surface thereof; and
   e) transducer means converting a torque about the torsion axis experienced by the pressure sensing planar member to a fluctuating electrical signal providing information on vortex shedding from the vortex generating bluff body.

12. A combination as set forth in claim 11 wherein said combination includes means for determining velocity of the fluid as a function of frequency of said fluctuating electrical signal.

13. A combination as set forth in claim 11 wherein said combination includes means for determining mass flow rate of the fluid as a function of frequency and amplitude of said fluctuating electrical signal.

14. A combination as set forth in claim 13 wherein said combination includes means for determining density of the fluid from ratio of the mass flow rate to volume flow rate of the fluid determined as a function of frequency of said fluctuating electrical signal.

15. A combination as set forth in claim 11 wherein the pressure sensing planar member is disposed within the planar cavity included in the vortex generating bluff body in a pivotable arrangement about the torsion axis generally parallel to the direction of the fluid flow.

16. A combination as set forth in claim 11 wherein the pressure sensing planar member is disposed within the planar cavity included in the vortex generating bluff body in a pivotable arrangement about the torsion axis generally perpendicular to the direction of the fluid flow.

17. A combination as set forth in claim 11 wherein the pressure sensing planar member is disposed within the planar cavity included in a combination of the vortex generating bluff body and a structural extension thereof extending from one extremity of the vortex generating bluff body and supported by the wall of the planar cavity in an arrangement allowing at least a minute amount of pivoting movement about the torsion axis generally parallel to the direction of the fluid flow, wherein said first half of the pressure sensing planar member is disposed substantially within a first half of the planar cavity included in the vortex generating bluff body and said second half of the pressure sensing planar member is disposed substantially within a second half of the planar cavity included in said structural extension of the vortex shedding bluff body.

18. An apparatus for measuring fluid flow comprising in combination:
 a) a vortex generating bluff body disposed at least partially across a flow passage and secured to a supporting body at at least one extremity thereof;
 b) a pressure sensing planar member disposed in a planar cavity included in the supporting body and supported by wall of the planar cavity in an arrangement allowing at least a minute amount of pivoting movement of the pressure sensing planar member about a torsion axis disposed at a midsection of the pressure sensing planar member in a parallel relationship to the pressure sensing planar member;
 c) at least one pressure communicating hole extending from one side surface of the vortex generating bluff body to one side wall of the planar cavity adjacent to one side surface of a first half of the pressure sensing planar member located on one side of a plane including the torsion axis and to the other side wall of the planar cavity opposite to said one side wall thereof and adjacent to the other side surface of a second half of the pressure sensing planar member located on the other side of said plane opposite to said one side, and at least another pressure communicating hole extending from the other side surface of the vortex generating bluff body opposite to said one side surface thereof to said other side wall of the planar cavity adjacent to the other side of said first half of the pressure sensing planar member opposite to said one side thereof and to said one side wall of the planar cavity adjacnet to one side surface of said second half of the pressure sensing planar member opposite to said the other side thereof; and
 d) transducer means converting a torsional movement of the pressure sensing planar member about the torsion axis to a fluctuating electrical signal providing information on the fluid flow.

* * * * *